Patented Apr. 10, 1951

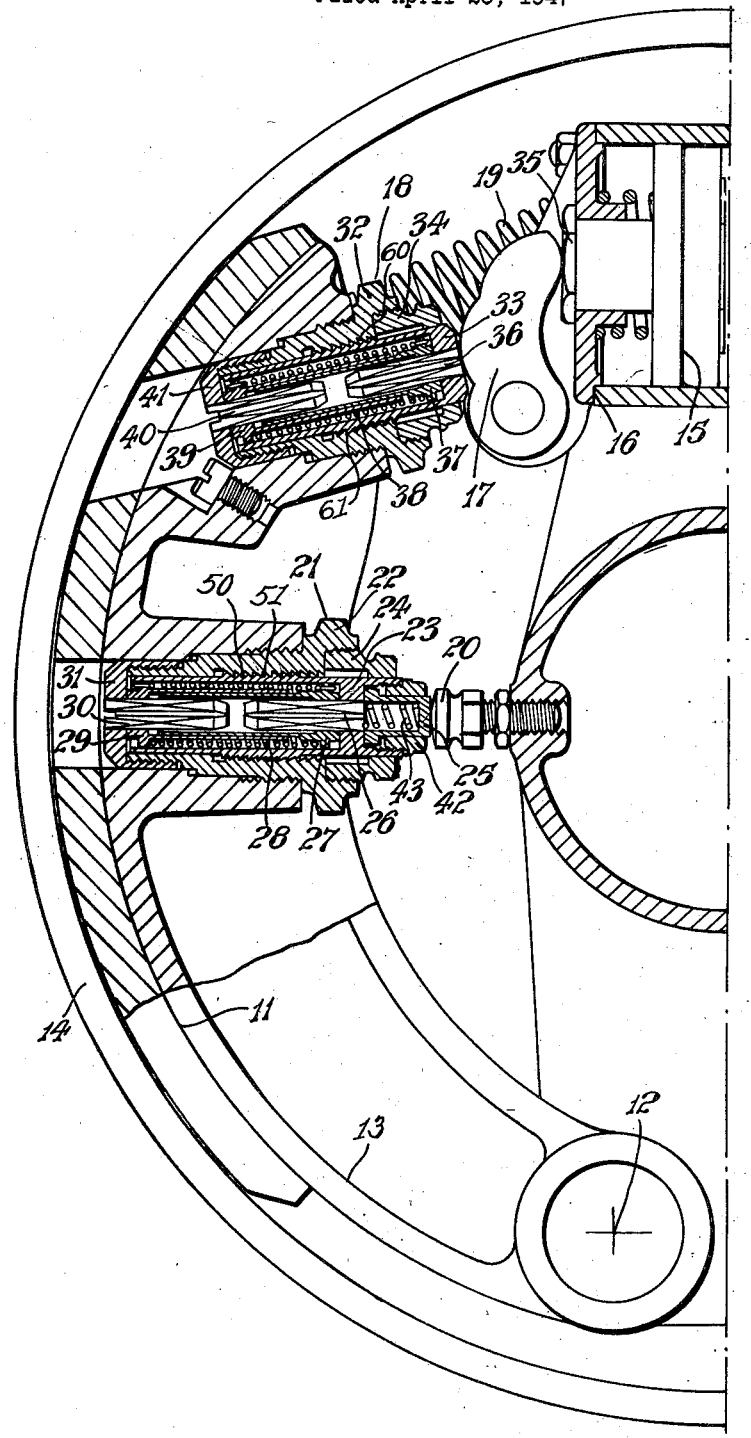

2,548,044

UNITED STATES PATENT OFFICE 2,548,044

BRAKE ADJUSTING DEVICE

Fred Neale, Coventry, England

Application April 23, 1947, Serial No. 743,251
In Great Britain February 22, 1946

3 Claims. (Cl. 188—79.5)

This invention relates to automatic adjusting devices of the irretractile type for brakes of the wheel and transmission type, said devices being associated with the shoe or shoes of such brakes and/or their co-operating brake parts.

The object of the present invention is to provide an adjusting device of the type referred to adapted to provide adjustment of a brake shoe to a degree considerably finer than that obtained by ratchet devices in which there is an inherent lost motion.

A further object of this invention is to provide a device of the type referred to which is readily adapted as a unit to either prevent undue retraction of the brake shoe from the brake drum on wear of the friction surface of the brake shoe taking place, or to act as automatic take up means between the brake shoe and the latter's application means. Preferably these two functions are effected by two such units working in combination, or one such unit working in combination with other types of brake adjusting devices such as those described in the specification of my prior Patent Number 2,493,993 and copending application Number 743,249.

Referring to the accompanying drawing there is shown a part view in section of an internally expanding vehicle brake incorporating automatic adjusting devices according to the present invention.

The brake shoe 11 is pivoted at 12 on a carrier 13 and is adapted for movement into engagement with the brake drum by means of a fluid actuated piston 15 carried in the cylinder 16 which is fast with the carrier 13. The said piston 15 actuates the brake shoe 11 through the lever 17 pivoted on the cylinder 16 and adjustment device 18 carried by the brake shoe 11. The brake shoe 11 is retracted from engagement with the drum 14 by the spring 19 to a stop 20 on the carrier 13 through adjustment device 21 carried by the shoe 11.

The adjustment device 21 consists of a housing 22 mounted in the brake shoe 11 and having an internal screw thread 50 co-operating with an external screw thread 51 on a plunger 23 carried rotatably and thus axially movable in the internally screwed housing 22. The plunger 23 extends through the cap 24 on the housing 22 and is adapted to abut the stop 20 by means of the plug 25 and a lost motion means hereinafter described.

Integrally associated with the plunger 23 is a square shaft 26 which co-operates with a square hole in the sleeve 27 to which sleeve is attached one end of a coil spring 28 the other end of said spring being attached to the sleeve 29 telescopic with said sleeve 27 and having a square hole co-operating with a square shaft 30 fast with the cap 31 which screws onto the housing 22.

The adjustment device 18 consists of the housing 32 mounted in the brake shoe 11 and having an internal screw thread 60 co-operating with an external screw thread 61 formed on a plunger 33 carried rotatably and thus axially movable in the internal screwed housing 32. The plunger 33 extends through the cap 34 which is screwed onto the housing 32, and is adapted for abutment on the lever 17 of the brake shoe application means which in turn abuts the nut 35 on the piston 15, said nut 35 abutting the end of the cylinder 16 when the brake shoe 11 is in its retracted position.

Integrally associated with the plunger 33 is a square shaft 36 which co-operates with a square hole in the sleeve 37 to which sleeve is attached one end of a coil spring 38, the other end of said coil spring being attached to a sleeve 39 telescopic with the aforesaid sleeve 37 and having a square hole co-operating with a square shaft 40 fast with the cap 41, which cap screws on the housing 32.

The arrangement is such that during assembly, the adjustment devices 18 and 21 are mounted in the brake shoe 11 less the telescopic sleeves and their associated springs and caps. The brake shoes are mounted on the carrier 13 with their application and retraction means but prior to the assembly of the brake drum 14 each of the beforementioned tube and spring units is inserted into its respective plunger 23 or 33 and each cap 31 or 41 screwed onto its respective housing 22 or 32, which operation by virtue of the square shafts 26 and 30, 36 and 40 and abutment of the plungers 23 and 33 on the stop 20 and lever 17 respectively, winds up the springs 28 and 38 thereby urging said plungers 23 and 33 to rotate and thus advance axially in their respective housings 22 and 32.

Thus when wear of the friction surface of the brake shoe 11 occurs the application of the brake shoe 11 to the brake drum 14 moves the adjusting device 21 from the stop 20 thereby permitting the plunger 23 to be rotated in the housing 22 by its spring 28 to take up the clearance created between the end of said plunger 23 and the stop 20, so that the brake shoe 11 on being retracted from the brake drum 14 takes up a position nearer to the brake drum 14 than it occupied before wear of the friction surface occurred.

The plug 25 is adapted for axial movement between abutments on the plunger 23 and the cap 42 carried by the plunger 23. The compression spring 43 urges the plug 25 towards abutment with the cap 42, which spring is sufficiently strong to prevent rotation and hence axial movement of the plunger 23 in the housing 22 until the plug 25 and the cap 42 abut one another and the plug 25 tends to leave the stop 20. In this way lost motion means are provided to ensure that brake shoe clearance is maintained when the brake shoe is retracted and that the automatic adjusting device 21 does not take up this clearance.

When the brake shoe 11 takes up a new retracted position nearer to the brake drum 14 as herein described, the resulting increased clearance between the retracted brake shoe 11 and the retracted piston 15 is taken up by axial movement of the plunger 33 relative to the housing 32 due to rotation therein of the plunger 33 by the spring 38. Thus it will be observed that the adjuster 18 takes up any clearance that occurs between the brake shoe 11 and its operating lever 17 when the brake shoe is stopped short of its original retracted position.

It is to be understood that whereas the adjusting devices 18 and 21 have been described and illustrated with respect to one shoe, such devices are applied to all shoes of a brake or set of brakes in which it is desired to effect automatic means of adjustment as herein described.

I claim:

1. A brake adjusting device of the character described comprising in combination a housing member, a plunger extending within said housing member and having a screwed portion engaging a cooperating screwed portion in said housing member, an operative end of said plunger extending from said housing member, a coil spring within said plunger, a sleeve disposed within the said spring and secured thereto at one end thereof, said sleeve having a non-circular hole at said end, a non-circular portion of the plunger being received in said hole, a second sleeve telescopic with respect to said first sleeve and secured at one end to the other end of said spring, said end of said second sleeve having a non-circular hole therein, and a cap screwing onto said housing and having a non-circular portion engaging the non-circular hole in said second sleeve for securing the spring and sleeve assembly in position and for winding up the said spring to exert a rotational force on the plunger.

2. A brake adjusting device of the character described comprising a housing, a plunger extending within said housing and having a screwed portion engaging a cooperating screwed portion in said housing an operative end of said plunger extending from said housing, a coil spring within said plunger, a sleeve disposed within said spring and secured thereto at one end thereof, said end of said sleeve having a square hole therein, a square projection of the said plunger being received in said hole, a second sleeve telescopic with respect to said first sleeve and secured at one end to the other end of said spring, said end of said sleeve having a square hole formed therein, and a cap screwing onto said housing and having a square projection engaging the square hole of said second sleeve for securing the spring and sleeve assembly in position and for winding up the said spring to exert a rotational force on the plunger.

3. A brake adjuster according to claim 1 wherein the plunger is formed with two relatively spaced abutments, in combination with a plug coaxial with said plunger mounted for restricted axial movement between said abutments, and resilient means compressed between said plug and plunger to urge said plug outwardly from the operative end of said plunger against one of said abutments, said resilient means being arranged and proportioned to exert a greater axial force on said plunger than is exerted by the combined effects of said coil spring and the threaded engagement between said plunger and its housing when said resilient means is further compressed by movement of said plug toward the other of said abutments.

FRED NEALE.

REFERENCES CITED

The following references are of record in the file of this patent:

UNITED STATES PATENTS

| Number | Name | Date |
| --- | --- | --- |
| 1,934,235 | Rockwell | Nov. 7, 1933 |
| 2,191,429 | Jenkins et al. | Feb. 20, 1940 |
| 2,205,889 | Mabrito | June 25, 1940 |
| 2,241,163 | Rouch | May 6, 1941 |
| 2,242,685 | Swift | May 20, 1941 |